US005721326A

United States Patent [19]
Frost

[11] Patent Number: 5,721,326
[45] Date of Patent: Feb. 24, 1998

[54] POLYMERIZABLE COMPOSITIONS AND METHOD OF USING SAME

[75] Inventor: George W. Frost, Afton, Minn.

[73] Assignee: Minnesota Mining and Manufacturing Company, St. Paul, Minn.

[21] Appl. No.: 616,831

[22] Filed: Mar. 19, 1996

Related U.S. Application Data

[63] Continuation of Ser. No. 384,977, Feb. 7, 1995, abandoned, which is a continuation-in-part of Ser. No. 358,844, Dec. 16, 1994, abandoned, which is a continuation of Ser. No. 242,373, May 13, 1994, Pat. No. 5,387,661.

[51] Int. Cl.$^6$ .............................. C08F 4/26; C08F 224/00; C08F 216/12; C08F 220/10
[52] U.S. Cl. .................. 526/90; 526/273; 526/328.5; 526/332; 526/283
[58] Field of Search ...................... 526/90, 273, 283, 526/328.5, 332

[56] References Cited

U.S. PATENT DOCUMENTS

| | | | |
|---|---|---|---|
| 4,197,225 | 4/1980 | Emmons et al. | 260/23 |
| 4,400,413 | 8/1983 | Emmons et al. | 427/136 |
| 4,463,117 | 7/1984 | Malin | 524/260 |
| 4,910,080 | 3/1990 | Frost | 428/307.3 |
| 4,910,255 | 3/1990 | Wakabayashi et al. | 525/100 |
| 5,250,645 | 10/1993 | Maurer | 526/320 |
| 5,387,661 | 2/1995 | Frost | 526/90 |

FOREIGN PATENT DOCUMENTS

| | | |
|---|---|---|
| 0 145 685 | 6/1985 | European Pat. Off. . |
| 0 421 567 | 4/1991 | European Pat. Off. . |
| 0 619 348 | 10/1994 | European Pat. Off. . |
| 60-120780 | 6/1985 | Japan . |
| 88/04675 | 6/1980 | WIPO . |

OTHER PUBLICATIONS

"Coatings Performance Materials Concrete Sealer Coating Formulation with Santolink® XI 100 Crosslinker–Initiator", Pub. No. 2029249.

*Primary Examiner*—Joseph L. Schofer
*Assistant Examiner*—Wu C. Cheng
*Attorney, Agent, or Firm*—Gary L. Griswold; Walter N. Kirn; Doreen S. L. Gwin

[57] ABSTRACT

Polymerizable compositions comprising (a) hydroxypropyl methacrylate; (b) a $C_8$ to $C_{10}$ alkyl ester of acrylic or methacrylic acid; and (c) a free-radical initiator.

30 Claims, No Drawings

POLYMERIZABLE COMPOSITIONS AND METHOD OF USING SAME

CROSS-REFERENCE TO RELATED APPLICATION

This is a continuation of application Ser. No. 08/384,977 filed Feb. 7, 1995, now abandoned which is a continuation-in-part application of U.S. Ser. No. 08/358,844, filed Dec. 16, 1994 now abandoned, which is a continuation of U.S. Ser. No. 08/242,373, filed May 13, 1994, now U.S. Pat. No. 5,387,661.

FIELD OF THE INVENTION

This invention relates to polymer compositions.

BACKGROUND OF THE INVENTION

Polymer concrete compositions comprising dicyclopentenyl acrylate or methacrylate and an alkyl acrylate or methacrylate, and compositions comprising a dicyclopentenyloxyalkyl acrylate or methacrylate and a hydroxy-alkyl methacrylate are described in U.S. Pat. Nos. 4,197,225 and 4,400,413, respectively. Impregnating compositions comprising dicyclopentenyl acrylate or methacrylate and an alkyl acrylate or methacrylate are described in U.S. Pat. No. 4,910,080.

SUMMARY OF THE INVENTION

The present invention provides a novel, low odor, low viscosity, high flash point composition comprising:

(a) a major amount of an ester of acrylic or methacrylic acid having a $T_g$ of greater than about 50° C.;

(b) a major amount of a $C_8$ to $C_{18}$ alkyl ester of acrylic or methacrylic acid; and (c) a free-radical initiator for polymerizing components (a) and (b);

wherein the composition when aged for 14 days at 55° C. exhibits a break strain value of at least about 20% (preferably at least about 100%), a break stress value of less than about 4200 kps (preferably less than about 2700 kps and most preferably about 700 to 2400 kps), and a tensile modulus value of less than about 100,000 kps (preferably less than about 35,000 kps, and most preferably about 7,000 to 17,500) when tested in accordance with ASTM D638 i) operating at a strain rate of 0.635 cm per minute, ii) using type I mold dimensions for fabrication of the tensile dumbbells, and iii) the composition being tested according to said ASTM D638 being free of any filler which may be added to or ultimately contained in the composition when used.

The compositions of the invention are useful in the protection of concrete surfaces and the repair of concrete.

Depending upon the intended use of the composition of the invention, the compositions may further include filler such as a powder or granular aggregate such as in the case where the composition is to be used to repair larger concrete cracks, etc.

Preferred compositions of the invention prior to inclusion of any filler and subsequent cure exhibit a viscosity of less than 100 cps, preferably less than 50 cps, and most preferably less than 20 cps when measured according to EXAMPLE 1 below.

Methods of using the compositions of the invention to prepare or repair a concrete surface are also described wherein the break stress value of the composition once aged (and free of any filler which may actually be employed therein) is less than that of the hardened concrete.

DETAILED DESCRIPTION

Examples of suitable monomers for use as component (a) of the compositions of the invention have a $T_g$ greater than about 50° C. and have no polymerizable sites of unsaturation other than the single acrylate or methacrylate moiety. Specific examples of suitable monomers are hydroxypropyl methacrylate, hydroxyethyl methacrylate, isobornyl methacrylate, and methyl methacrylate, butyl methacrylate and glycidyl methacrylate.

Examples of suitable acrylic acid or methacrylic acid esters for use as component (b) of the composition include the esters of acrylic acid or methacrylic acid with $C_8$ to $C_{18}$ alcohols. Suitable esters meeting the foregoing definition are stearyl methacrylate and lauryl methacrylate. Specific examples of preferred esters are $C_8$ to $C_{10}$ alkyl esters such as iso-octyl acrylate and iso-decyl methacrylate.

The compositions of the invention may further comprise as component (d) a crosslinking agent which preferably is polyallylic or has one acrylate or methacrylate moiety and one vinyl site (other than the site of $\alpha$, $\beta$-unsaturation contained in the acrylate or methacrylate moiety). A crosslinking agent facilitates rapid cure of the composition to a tack-free state which is preferably obtained in less than about 12 hours at 20° C. Examples of preferred crosslinkers are selected from the group consisting of a polyallyl glycidyl ether resin, dicyclopentyl ethoxy methacrylate, allyl methacrylate, dicyclopentyl acrylate, and dicyclopentyl methacrylate.

Monomer components (a) and (b) will preferably be present in amounts of about 20 to 80 and about 80 to 20 parts by weight, respectively, both based on 100 parts by weight of the total amount of the polymerizable monomer components (i.e., components (a), (b) and any other polymerizable component such as (d) which may be present). Component (d) if present will preferably be present in an amount of about 5 to 30 parts by weight per 100 parts by weight of the total amount by weight of the polymerizable monomer components (i.e., components (a), (b) and any other polymerizable component such as (d) which may be present).

The free radical initiator that may be used in the composition of this invention as component (c) is any polymerization agent that will furnish free radicals under polymerization conditions. The initiator is used in an amount effective to produce substantially complete polymerization of the polymerizable components (i.e., components (a), (b) and any other polymerizable component such as component (d) which may be present) at ambient temperature within less than about 24 hours. Preferably, the free radical initiator is present in an amount that is about 0.05 to 5 parts by weight per 100 parts by weight of the total amount of polymerizable components. Particularly preferred initiators are organic peroxy compounds such as benzoyl peroxide and cumene hydroperoxide. The free radical initiator may be a photoinitiator, which is an agent that is sensitive to ultraviolet light as would be provided in sunlight or in UV lamps. Examples of such a photoinitiator are acetophenones, such as 2,2-dimethoxy-2-phenylacetophenone (commercially available as Irgacure 651 from Ciba-Geigy Corp., Hawthorne, N.Y.) and diethoxyacetophenone; benzil; and benzoin ethers.

The composition of the invention may contain mixtures of two or more different free radical initiators. For example, both an organic peroxy compound and a photoinitiator may be utilized to provide a rapid cure with particularly rapid cure of the outermost layer of the coating from exposure to light.

A promoter as component (e) is preferably incorporated in the composition in the instance component (d) is employed. The promoter catalyzes the oxidative reaction of the site of vinyl unsaturation in component (d). A preferred promoter is a metal salt promoter. Component (e) if employed should be present in an amount effective to enhance speed and completeness of cure of the composition. Thus, when only a photoinitiated free radical initiator is utilized, the incorporation of the metal salt promoter is particularly desirable to assure complete cure of the composition throughout the permeated concrete. When the free radical initiator is an organic peroxide, the additional use of the metal promoter is desirable to provide a more rapid cure of the polymer than would be possible in the absence of the metal promoter. Typically, the metal promoter is present in the composition in amounts such that metal is present in about 0.0005 to 2 parts by weight per 100 parts by weight of the total amount of the polymerizable components.

Metal promoters which may be employed as component (e) preferably comprise cobalt metal ion. If desired the cobalt metal ion may be employed together with an aluminum salt of an inorganic acid or aliphatic acid or an oxide of the cobalt and/or aluminum. Examples of such salts include the chloride, nitrate, borate, sulfate, acetate, acetyl acetonate, propionate, butyrate, pentanoate, octoate, hexoate and naphthenate. Additionally, the metal promoter may include the salt of such complex acids as resinic acid, tall oil fatty acids, linseed oil fatty acids, lauric acids, palmitic acid, myristic acid, stearic acid, oleic acid, linoleic acid, linolenic acid, behenic acid, cerotic acid, montanic acid and abietic acid.

When the composition of the invention is stored in the presence of a promoter, the compositions may also contain a volatile reaction inhibitor to prevent premature polymerization of the polymerizable components before application to the desired substrate. Because these inhibitors are volatile, they dissipate in the air upon application of the composition to the substrate and no longer inhibit the polymerization reaction. Preferred inhibitors include volatile oximes such as methylethyl ketone-oxime, methylbutyl ketone-oxime, 5-methyl-3-heptanone-oxime, cyclohexanone-oxime and butyraldehyde-oxime. Volatile reaction inhibitors are present in an effective amount, preferably in amounts of about 0.01 to 2 parts by weight per 100 parts by weight of the total amount of the polymerizable components.

The filler which may be employed in the compositions of the present invention are well known to those skilled in the art and include conventional materials ranging from powders to granular aggregate. Examples of suitable fillers are pebbles, sand or other large and small aggregates used in preparing concrete. Other generally high modulus inorganic silicaneous materials may be employed. Still further, examples of suitable fillers are glass bubbles or beads, colorquartz, carbon black, pigments and fumed silica. Preferably the filler will have a void volume of less than about 25%. Further, preferably the filler comprises a mixture of large, small and fine filler to provide higher compressive strengths than ordinarily obtained if only a filler of one size is employed.

Typically, the filler will be present in an amount of about 300 to 2000 parts by weight, and preferably will be present in an amount of about 550 to 900 parts by weight per 100 parts by weight of the total amount of the polymerizable components.

Preferably the composition of the invention also includes a wax to facilitate surface cure.

The composition of the present invention may additionally comprise further additives, such as coloring agents, stabilizers, thickeners, rheological modifiers, preservatives or anticorrosive agents.

The composition of the present invention is typically provided as a three-part mixture comprising components (a), (b) and (d), if present, in the indicated ratios in one container, the metal promoter (e), if employed in a second container, and the free radical initiator (c) in a third container. Any filler employed would be contained in a fourth container. The free radical initiator should not be combined with the metal drier combination without components (a), (b) and (d) present due to the violent reaction that would ensue. Alternatively, this composition may be provided as a two-part system. In such a system, the components (a), (b) and (d), if employed, are provided in one container, optionally together with the metal promoter (e) and a stabilizer. The free radical reaction initiator (c) is provided in a second container and is mixed together with monomer components (a), (b) and (d), if employed, at the site of application together with any filler which may be employed.

The compositions of the invention are useful in the surface treatment or penetration of concrete. In such an application a traction coating of sand may be employed which is applied to the surface of the coating after it has been spread. The compositions of the invention are also useful in the repair of concrete such as filling cracks, etc. In the latter applications, inclusion of filler may be desirable particularly in the case of repair of larger cracks, potholes or spalls.

In the following examples, all compositions are reported in parts by weight.

EXAMPLE 1

Three component monomer-resin blends were prepared from hydroxypropyl methacrylate, HPMA, (Rocryl™410, Rohm & Haas, Philadelphia, Pa.), isodecyl methacrylate, IDMA, (Rocryl™310, Rohm & Haas, Philadelphia, Pa.) and poly allyl glycidyl ether resin, PAGE, (Santolink™XI-100, Monsanto Co., St. Louis, Mo.). The proportions that were blended and mixed are shown in TABLE 1 below. To each monomer-resin blend, a paraffinic wax (Eskar™25, Amoco Chemicals, Chicago, Ill.) was melted into the mixture at 60° C. at the two levels specified in TABLE 1. A cobalt promoter (Copac™, Huls America, Inc., Piscataway, N.J.) and an aluminum promoter (ADC™1020, OMG, Cleveland, Ohio) were added and mixed into the solution blend. To begin the curing, 3 parts of cumene hydroperoxide (83%; Elf Atochem, Philadelphia, Pa.) was added per 100 parts of the promoter/monomer/resin/wax blend.

The evaluation results of the low modulus composition of the Example is recorded in TABLE 2. Solution viscosities were determined at 20° C. with a Brookfield™ Viscometer using the ultralow viscosity adaptor kit and operated at 100 rpm. The flash points shown were the closed cup values in °F. Cure results were determined by pouring the mixed compositions into a 20×30 cm aluminum tray, so that the resulting coating was about 2 mm thick. The time in hours recorded was that required to reach a non-tacky surface finish at 20° C. Tensile strengths and property stability were determined by molding tensile dumbbells and testing per ASTM D638, incorporated herein by reference. The composition was poured into type I mold dimensions and tested at a strain rate of 0.635 cm per minute. The dumbbell specimens were aged at 20° C. for one week to obtain initial tensile strengths and aged at 55° C. for two weeks in a dry oven to determine tensile stability with time. Initial and aged breaking stress, breaking strain, and tensile modulus observed is recorded in TABLE 2.

TABLE 1

| Ingredient, wt % | Example 1 (Low Modulus) |
| --- | --- |
| HPMA | 30.9 |
| IDMA | 51.5 |
| PAGE | 14.7 |
| WAX | 1.0 |
| Cobalt promoter | 0.6 |
| Aluminum promoter | 1.3 |
| | 100.0 |

TABLE 2

| PROPERTY | EXAMPLE 1 |
| --- | --- |
| Odor | Low |
| Viscosity, cps | 7.5 |
| Flash point, °F. | greater than 200° F. (93° F.). |
| Cure time, hours to non-tacky finish | less than 7 hours |
| Initial Tensile Strength (1 week at 20° C.) | |
| Break Stress, kps | 1,545 |
| Break Strain, % | 251.4 |
| Modulus, kps | 6,341 |
| Aged Tensile Strength (2 weeks at 55° C.) | |
| Break Stress, kps | 2,132 |
| Break Strain, % | 152.0 |
| Modulus, kps | 10,087 |

Preferred low modulus compositions of the invention exhibit a break strain after aging (as aged and tested above) of at least about 20%, and more preferably at least about 100%.

EXAMPLE 2

A composition according to the invention was prepared generally according to the procedures indicated in EXAMPLE 1 above using the ingredients defined in EXAMPLE 1 in the amounts stated in TABLE 3 below:

TABLE 3

| Ingredient, wt % | |
| --- | --- |
| HPMA | 30 |
| IDMA | 50 |
| PAGE | 18 |
| WAX | 1.1 |
| Cobalt promoter | 6.9 |

The composition of this Example performed suitably as a low modulus composition and exhibited aged tensile strengths (2 weeks at 55° C.) as follows.

The break stress was 1,276 kps. The break strain was 111%. The tensile modulus was 13,862 kps.

EXAMPLES 3-5

Composition of the invention comprising the ingredients in the amounts stated as weight percent indicated in TABLE 4 below were prepared. Aged tensile strengths (2 weeks at 55° C.) were determined following the procedures of EXAMPLE 1.

TABLE 4

| | Example 3 | Example 4 | Example 5 |
| --- | --- | --- | --- |
| HPMA | — | 30 | 30 |
| IBOMA[1] | 30 | — | — |
| IDMA | 50 | — | 50 |
| SMA[2] | — | 50 | — |
| PAGE | 18 | 18 | — |
| Allyl MA[3] | — | — | 15 |
| Wax | 1.1 | 1.1 | 1.1 |
| Cobalt promoter | 0.9 | 0.9 | 1.5 |
| Aluminum promoter | — | — | 3.5 |
| Aged Tensile Strength 2 wks/55° C. | | | |
| Break Stress, kps | 1,014 | 1,366 | 3,105 |
| Break Strain, % | 130 | 37 | 208 |
| Modulus, kps | 16,049 | 15,338 | 20,727 |

[1]Isobornyl methacrylate
[2]Stearyl methacrylate
[3]Allyl methacrylate

What is claimed is:

1. A composition comprising:
   (a) a major amount of an ester of acrylic or methacrylic acid having a $T_g$ of greater than about 50° C.;
   (b) a major amount of a $C_8$ to $C_{18}$ alkyl ester of acrylic ester of acrylic acid or methacrylic acid;
   (c) a crosslinking agent which is polyallylic or contains one acrylate or methacrylate moiety and one site of vinyl unsaturation; and
   (d) a free-radical initiator for polymerizing components (a), (b) and (c);

wherein said composition when aged for 14 days at 55° C. exhibits a break strain value of at least about 20%, a break stress value of less than about 4200 kps, and a tensile modulus value of less than about 100,000 kps when tested in accordance with ASTM D638 i) operating at a strain rate of 0.635 cm per minute, ii) using type I mold dimensions for fabrication of the tensile dumbbells, and iii) the composition being tested in accordance with said ASTM D638 being free of any filler which may be added to said composition.

2. A composition according to claim 1, wherein monomer (a) is selected from the group consisting of hydroxypropyl methacrylate, hydroxyethyl methacrylate, isobornyl methacrylate and methyl methacrylate.

3. A composition according to claim 1, wherein monomer (b) is selected from the group consisting of iso-octyl acrylate, iso-decyl methacrylate, stearyl methacrylate and lauryl methacrylate.

4. A composition according to claim 1, wherein said crosslinking agent is selected from the group consisting of pollyallyl glycidyl ether resin, dicyclopentyl ethoxy methacrylate, allyl methacrylate, dicyclopentyl acrylate and dicyclopentyl methacrylate.

5. A composition according to claim 1, wherein said composition further comprises a promoter to facilitate reaction of said site of vinyl unsaturation.

6. A composition according to claim 5, wherein said promoter comprises a metal ion.

7. A composition according to claim 6, wherein said metal ion is cobalt.

8. A composition according to claim 1, wherein monomer component (a) is present in an amount of about 20 to 80 parts by weight and monomer component (b) is present in an amount of about 80 to 20 parts by weight, both per 100 parts by weight of the total amount of polymerizable components in said composition.

9. A composition according to claim 1, further comprising a filler having a void volume of less than about 25%.

10. A composition according to claim 1, wherein said break strain value is at least about 100%.

11. A composition according to claim 1, wherein said break stress value is between about 700 and 2400 kps.

12. A composition according to claim 1, wherein said tensile modulus value is less than about 35,000 psi.

13. A composition according to claim 1, wherein said break strain value is at least about 100%, said break stress value is between about 700 and 2400 kps and said tensile strength modulus value is less than about 35,000 psi.

14. A composition according to claim 1, wherein said composition cures to provide a substantially tack-free surface in less than about 12 hours at 20° C.

15. A method of preparing or repairing a concrete surface comprising applying a polymerizable composition to said surface and allowing said composition to harden, said composition comprising:

(a) a major amount of an ester of acrylic or methacrylic acid having a $T_g$ of greater than about 50° C.;

(b) a major amount of $C_8$ to $C_{18}$ ester of acrylic acid or methacrylic acid; and (c) a free-radical initiator for polymerizing components (a) and (b);

wherein said composition when aged for 14 days of 55° C. exhibits a break strain value of at least about 20%, a break stress value less than about the break stress of said concrete surface, and a tensile modulus value of less than about 100,000 kps when tested in accordance with ASTM D638 i) operating at a strain rate of 0.635 cm per minute, ii) using type I mold dimensions for fabrication of the tensile dumbbells, and iii) the composition being tested in accordance with said ASTM D638 being free of any filler which may be added to said composition when used.

16. A method according to claim 15, wherein monomer (a) is selected from the group consisting of hydroxypropyl methacrylate, hydroxyethyl methacrylate, isobornyl methacrylate and methyl methacrylate.

17. A method according to claim 15, wherein monomer (b) is selected from the group consisting of iso-octyl acrylate, iso-decyl methacrylate, stearyl methacrylate and lauryl methacrylate.

18. A method according to claim 15, further comprising a crosslinking agent (c) polymerizable with components (a) and (b).

19. A method according to claim 18, wherein said crosslinking agent is polyallylic or contains one acrylate or methacrylate moiety and one site of vinyl unsaturation.

20. A method according to claim 19, wherein said crosslinking agent is selected from the group consisting of pollyallyl glycidyl ether resin, dicyclopentyl ethoxy methacrylate, allyl methacrylate, dicyclopentyl acrylate and dicyclopentyl methacrylate.

21. A method according to claim 19, wherein said composition further comprises a promoter to facilitate reaction of said site of vinyl unsaturation.

22. A method according to claim 21, wherein said promoter comprises a metal ion.

23. A method according to claim 22, wherein said metal ion is cobalt.

24. A method according to claim 15, wherein monomer component (a) is present in an amount of about 20 to 80 parts by weight and monomer component (b) is present in an amount of about 80 to 20 parts by weight, both per 100 parts by weight of the total amount of polymerizable components in said composition.

25. A method according to claim 15, further comprising a filler having a void volume of less than about 25%.

26. A method according to claim 15, wherein said break strain value is at least about 100%.

27. A method according to claim 15, wherein said break stress value is between about 700 and 2400 kps.

28. A method according to claim 15, wherein said tensile modulus value is less than about 35,000 psi.

29. A method according to claim 15, wherein said break strain value is at least about 100%, said break stress value is between about 700 and 2400 kps and said tensile strength modulus value is less than about 35,000 psi.

30. A method according to claim 15, wherein said composition cures to provide a substantially tack-free surface in less than about 12 hours at 20° C.

* * * * *